(12) United States Patent
Lopez et al.

(10) Patent No.: US 8,736,893 B2
(45) Date of Patent: May 27, 2014

(54) REDUCTION OF PATTERN GLARE

(75) Inventors: Matthew G Lopez, Escondido, CA (US); Gareth Ryan Kelly, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 162 days.

(21) Appl. No.: 13/248,941

(22) Filed: Sep. 29, 2011

(65) Prior Publication Data
US 2013/0083333 A1    Apr. 4, 2013

(51) Int. Cl.
*G06K 15/02* (2006.01)
*H04N 1/60* (2006.01)

(52) U.S. Cl.
USPC .............. 358/1.2; 358/1.14; 358/1.15

(58) Field of Classification Search
USPC ......................... 358/1.2, 1.14, 1.15
See application file for complete search history.

(56) References Cited

U.S. PATENT DOCUMENTS

| | | | |
|---|---|---|---|
| 6,213,956 B1 | 4/2001 | Lawton | |
| 6,690,351 B1 | 2/2004 | Wong | |
| 6,729,729 B1 | 5/2004 | Irons | |
| 7,367,675 B2 | 5/2008 | Maddalena et al. | |
| 7,561,070 B2 | 7/2009 | Rhodes et al. | |
| 7,583,253 B2 | 9/2009 | Jeng et al. | |
| 7,798,645 B2 | 9/2010 | Roser | |
| 8,098,390 B1 * | 1/2012 | Yacoub et al. | 358/1.15 |
| 8,197,065 B2 | 6/2012 | Yoo et al. | |
| 8,497,868 B2 | 7/2013 | Lopez et al. | |
| 2003/0059762 A1 | 3/2003 | Fujiwara et al. | |
| 2004/0186713 A1 | 9/2004 | Gomas et al. | |
| 2007/0263242 A1 * | 11/2007 | Takahashi | 358/1.14 |
| 2008/0204471 A1 | 8/2008 | Jaeger et al. | |
| 2009/0186329 A1 | 7/2009 | Connor | |
| 2011/0032266 A1 | 2/2011 | Harbach et al. | |
| 2012/0075586 A1 | 3/2012 | Kirschen et al. | |

FOREIGN PATENT DOCUMENTS

| | | |
|---|---|---|
| KR | 2009-0097280 | 9/2009 |
| WO | WO-2004-112598 A1 | 12/2004 |

OTHER PUBLICATIONS

Dr. Paul Beidler, Optimized Typesetting by ReadHowYouWant, Jan. 22, 2006, 6 pages.
Bruce J.W. Evans et al., Effect of Pattern Glare and Color Overlays on a Simulated-Reading Task in Dyslexics and Normal Readers, Optometry & Vision Science, vol. 71, No. 10, pp. 619-628, USA.

(Continued)

Primary Examiner — Qian Yang

(57) ABSTRACT

A custom color profile is generated for a user in response to user input. A print-on-demand (POD) order for published content is received from the user. The POD order is fulfilled in view of the custom color profile for the user.

20 Claims, 11 Drawing Sheets

(56) References Cited

OTHER PUBLICATIONS http://www.lucid-research.com/documents/factsheets/Dyslexia%20and%20Visual%20%Stress%20(EDA%20Luxembourg%20Nov%202007).pdf, European Dyslexia Association, Luxembourg, Nov. 16, 2007, Dyslexia and Visual Stress, Chris Singleton, University of Hull, c.singleton@hull.ac.uk, pp. 1-40.

Stone, M., Choosing Colors for Data Visualization, (Webpage), Jan. 17, 2006.

Bruce J.W. Evans et al., Effect of Pattern Glare and Color Overlays on a Simulated-Reading Task in Dyslexics and Normal Readers, Optometry & Vision Science, vol. 71, No. 10, pp. 619-628, Oct. 1994, USA.

http://www.lucid-research.com/documents/factsheets/Dyslexia%20and%20Visual%20Stress%20(EDA%20Luxembourg%20Nov%202007).pdf, European Dyslexia Association, Luxembourg, Nov. 16, 2007, Dyslexia and Visual Stress, Chris Singleton, University of Hull, c.singleton@hull.ac.uk, pp. 1-40.

* cited by examiner

REDUCTION OF PATTERN GLARE

BACKGROUND

Pattern glare, which can also be referred to as Scotopic Sensitivity Syndrome (SSR) or Irlen Syndrome, refers to a hypersensitivity to contrast and repetitive patterns, including lines of print on a page. Sensitivity is heightened as the contrast of the page increases. For example, high bright paper in conjunction with florescent lighting conditions can decrease readability significantly, particularly among individuals with reading disabilities.

DETAILED DESCRIPTION

The problem of pattern glare is not limited to text printed on paper. The ever increasing use of computers and other devices, such as e-readers, to deliver content renders the users of those device subject to pattern glare. Furthermore, the problem of pattern glare may be exacerbated by the use of modern display technologies. Current display technologies, such as liquid crystal displays (LCD), are capable of producing high levels of brightness and contrast, which can contribute to the decreasing readability of text associated with the effects of pattern glare.

However, unlike text printed on paper, electronic display screen's output properties can be modified. Font sizes, densities, and colors may be modified based on an individual's susceptibility to the effects of pattern glare. The various parameters may be selected such that the effects of patterns glare may be reduced, and if possible, eliminated. Furthermore, the selected parameters may be adjusted based, on the environment in which the display is situated.

The example implementations described herein provide for techniques to select display parameters that may be effective in the reduction of pattern glare for a user. The parameters may include the font size, density, and color used to display text on a display. The user may be presented with a series of test screens prompting the user for input and the input may be used to determine the proper display parameters. In addition, the ambient environment in which the testing occurs may be measured to create a profile. The profile may then be used to make modifications to the parameters based on the environment in which the display screen is being used.

Figure 1:
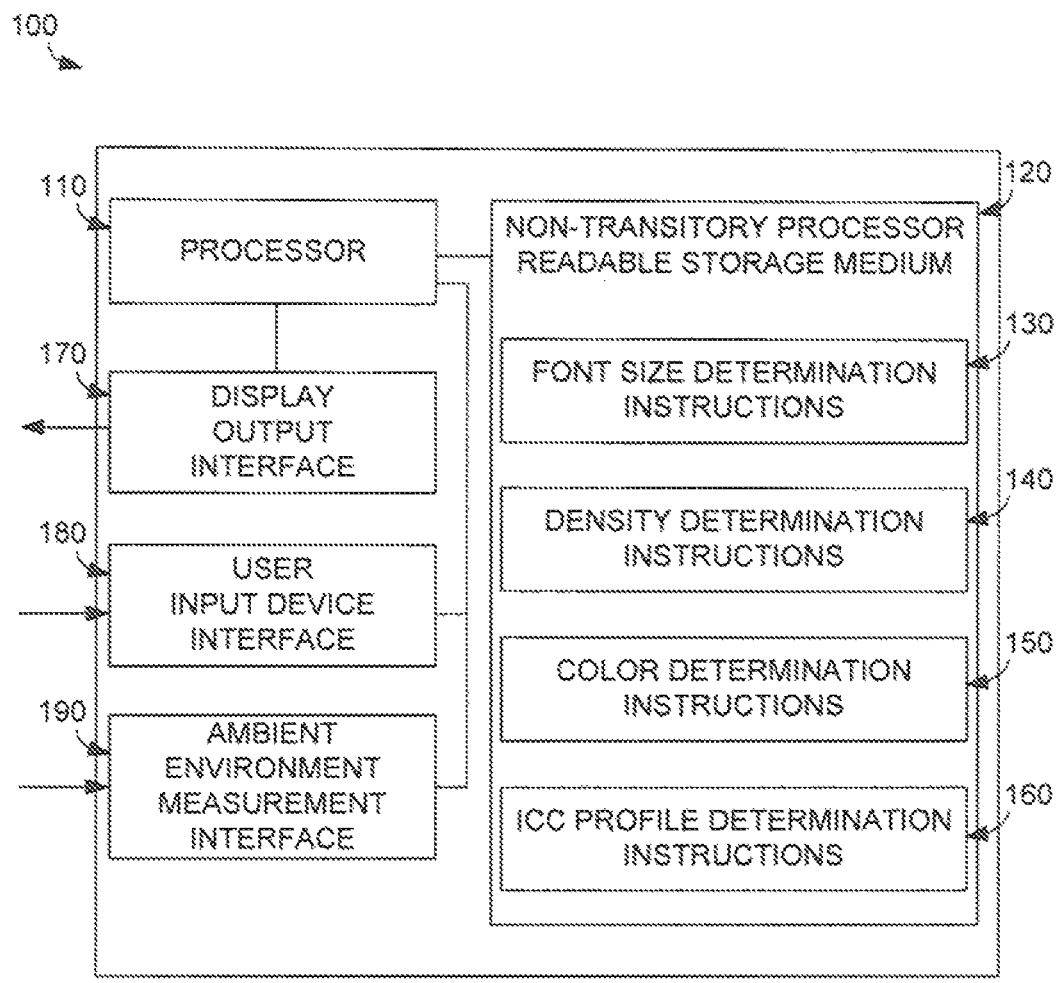
FIG. 1 depicts an example of a device that may implement techniques disclosed herein.

FIG. 1 depicts an example of a device that may implement techniques disclosed herein. The device 100 may include a processor 110. Coupled to the processor may be a non-transitory processor readable storage medium 120 containing thereon a set of instructions that if executed by the processor cause the processor to implement the techniques described herein. For example, the medium may contain font size determination instructions 130, density determination instructions 140, color determination instructions 150, and International Color Consortium (ICC) profile determination instructions 160. The functionality provided by the processor when the instructions are executed is described in further detail below.

In addition, the device 100 may include a display output interface 170. For example, in the case of a computer, the display output interface may be the connection to a monitor. In other example devices, the display may be integrated with the device. For example, laptop computers and e-readers may have an integrated display. Regardless of the type of display, the display output interface may be used by the processor 110 to allow the processor to adjust the output characteristics of the display. The device may also include a user input device interface 180. The user input device interface may allow the processor to receive input from the user. One example of a device utilizing the user input device interface may be a keyboard.

The device 100 may also include a ambient environment measurement interface 190. Through the ambient environment measurement interface, the processor may be able to measure factors, such as light intensity and color, of the environment in which the display is situated. One example of a device that may utilize the ambient environment measurement interface is a camera. Many consumer devices, such as laptops and tablets, may include one or more cameras that are able to measure the intensity and color of the light in the operating environment. For devices that do not contain an integrated camera, it is generally possible to add an external camera. Although a camera has been described as being used to measure the ambient environment, it should be understood that this is merely an example. Any component capable of measuring the intensity and color of the environment may be used and device 100 may include any such component.

Figure 2:
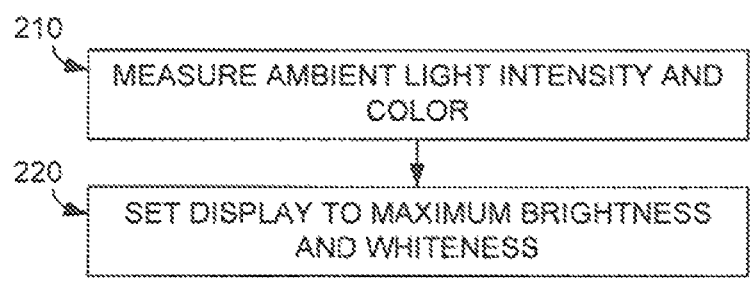
FIG. 2 depicts an example flow diagram for initialization.

FIG. 2 depicts an example flow diagram for initialization. In block 210 the ambient light intensity and color may be measured. The ambient light intensity and color may be stored for later use in creating an ICC profile, which will be described further below. In block 220 the display may be set to the maximum brightness and whiteness. The display may be set to the maximum brightness and whiteness to establish a baseline for the worst possible conditions for pattern glare. From this baseline, changes to the display properties may be made based on the results of the tests that are described below.

Figure 3:
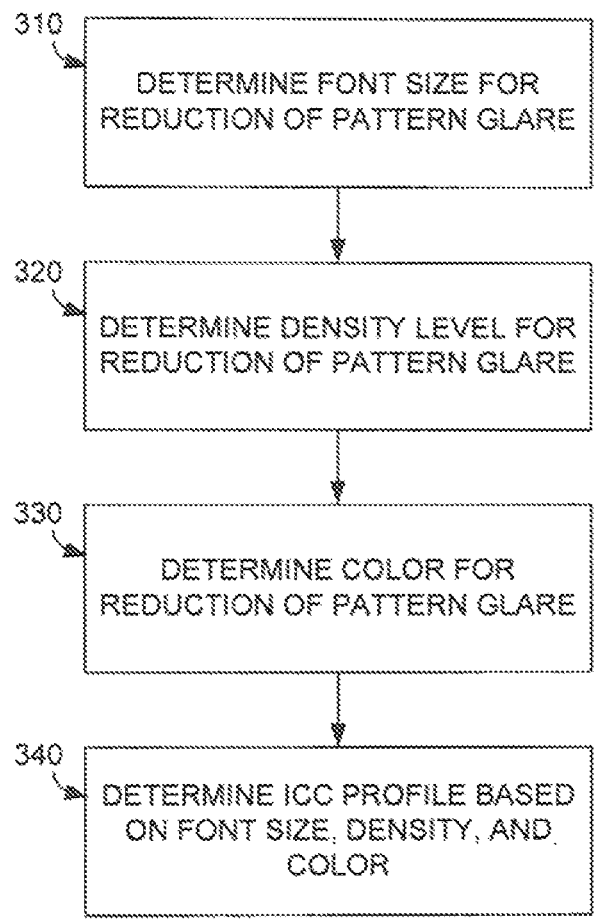
FIG. 3 depicts an example flow diagram for establishing parameters to reduce pattern glare.

FIG. 3 depicts an example flow diagram for establishing parameters to reduce pattern glare. As mentioned previously, three display parameters that may aid in the reduction of pattern glare are the size of the font that is displayed, the density level of the text, and the color on which the text is displayed. Techniques described herein provide for the determination of these parameters so as to reduce the effects of pattern glare.

In block 310, the font size that reduces pattern glare may be determined. In block 320, the density level that reduces pattern glare may be determined. In block 330, the color that reduces pattern glare may be determined. In general, the parameters may be determined by presenting the user with a series of test screens which alter each of the parameters independently. Based on the user's response to these test screens, the values for the parameters may be selected. The process of presenting the user with the test screens for each of these parameters will be described in further detail below.

In block 340, an ICC profile may be created based on the font size, density, and color along with the ambient environment which was measured earlier. The ICC profile may be used to calibrate a display when the display is in an environment that is different than the environment in which the parameters were determined.

Figure 4:
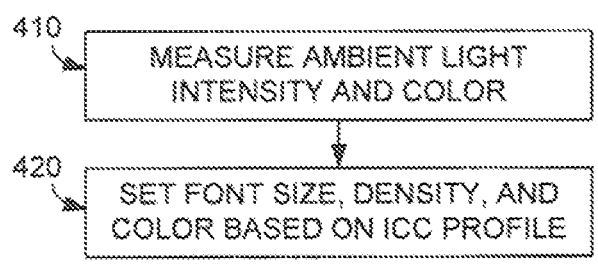
FIG. 4 depicts an example flow diagram for utilizing parameters for reducing pattern glare.

FIG. 4 depicts an example flow diagram for utilizing parameters for reducing pattern glare. In block 410, the ambient light intensity and color may be measured. As mentioned above, the environment in which the pattern glare reducing parameters were determined may be different than the environment in which the display is currently situated. For example, the parameters may have been determined while a user was using the device in an office with fluorescent lighting, while the user is now using the device outside. Each environment may have different lighting intensities and colors.

In block 420, the display device may be set to use the determined font size, density, and color, as adjusted by the ICC profile that was determined earlier. ICC profiles may be used to normalize display characteristics based on the current environment, such that the parameters are adjusted for the current environment. For example, the color that was determined to reduce pattern glare in an office environment may appear very different when the display is, in a natural light environment. Utilizing the ICC profile of the display device, the color may be adjusted to compensate for the difference in the ambient environment.

Figure 5:
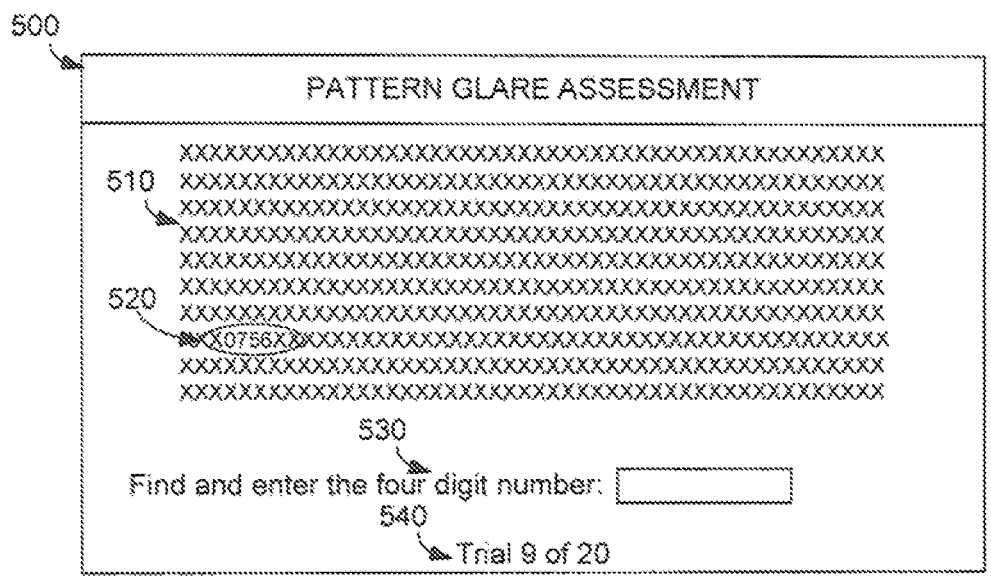
FIG. 5 depicts an example of a test screen used for selecting a font size.

FIG. 5 depicts an example of a test screen used for selecting a font size. The test screen 500 may include a series of repeating characters 510. Repeating characters may be used as opposed to actual words in order to reduce any impacts to the results of the tests based on the user's reading comprehension abilities. By using a series of repeating characters, the results of the tests are not influenced by factors that are not directly related to pattern glare. The screen shown in FIG. 5 is an example of a screen that demonstrates the effects of pattern glare. Upon viewing the screen, the reader may begin to see the characters and the individual lines blending together. The techniques described herein may be used to reduce this effect.

Embedded within the repeating characters may be randomly selected series of digits. For example, a randomly selected four digit number 520 may appear in a random position within the repeating characters. The user may be prompted to find and enter the four digit number 530. As will be explained in further detail with respect to FIG. 7, a series of such screens 540, using different font sizes, randomly selected numbers, and random placement within the repeating characters may be presented to the user. Using a combination of the user's response time and accuracy in correctly identifying the number, a font size that reduces pattern glare may be determined.

Figure 6:
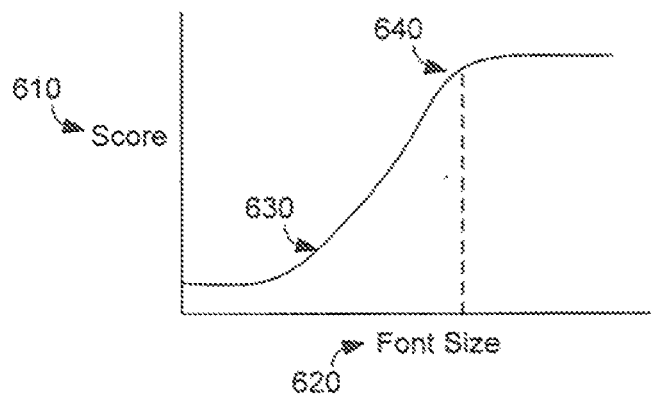
FIG. 6 depicts example results of font selection tests.

FIG. 6 depicts example results of font selection tests. For each test screen that is presented to a user, a score may be calculated based on the user's response time and accuracy of the user's response. These results may be analyzed to determine the font size that may reduce pattern glare. As shown in FIG. 6, the scores may form a two dimensional chart, with one axis 610 representing the scores and the other axis 620 representing the font size. If the scores are plotted, a general trend line 630 may be established.

As shown in FIG. 6, the results may show that as the font size is increased (moving to the right) the scores tend to improve. Such a result may be expected because as the font size is increased, fewer characters are displayed to the user, thus making the task of identifying the four digit number on the test screen easier. However, at some point further increases in the font size may no longer substantially change the user's scores. As shown, at a certain font size 640, there is a flattening of the trend line. At this point, further increases in font size may no longer provide substantial improvements in the scores. The font size that is slightly before the flattening of the trend line may be determined to be the font size that is used for reduction of pattern glare, as further increase in the font size would no longer result in improvements to the scores while further reduction in the font size may result in lower scores.

Figure 7:
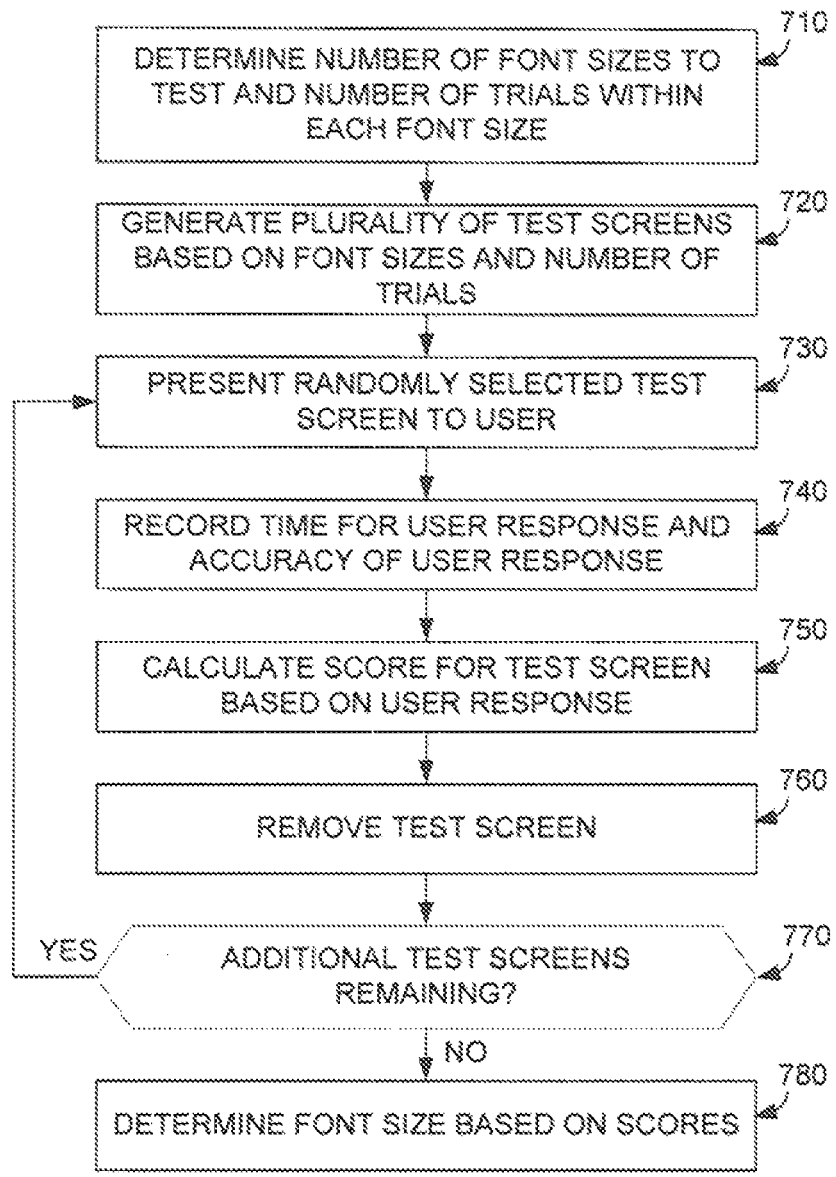
FIG. 7 depicts an example flow diagram for selecting a font size.

FIG. 7 depicts an example flow diagram for selecting a font size. In block 710 the number of font sizes to test and the number of trials within each font size may be determined. In some example implementations, the number of font sizes and trials may be static and is determined by design. For example, the design may specify that four font sizes will be tested and that there will be five trials within each font size. In other example implementations, the numbers may be dynamically determined at the time the test is run based on how much time the user is willing to spend. For example, the user may be prompted to enter how much time he is willing to spend. Using this information and the average time of completion of a test screen, the system may determine how many test screens can be completed within the user specified time. The system may then divide those total number of test screens by the number of fonts to be tested to determine how many trials there may be within each font size. For purposes of the remainder of this disclosure, it will be assumed that there are four font sizes that will be tested, with five trials within each font size. However it should be understood that this assumption is only for purposes of ease of description.

In block 720 a plurality of test screens based on the determined number of font sizes and number of trials within each font size may be created. For example, in the present example, there will be five test screens generated for each of the four font sizes, resulting in a total of twenty test screens. As described with respect to FIG. 5, each test screen may contain a randomly selected sequence of digits contained within a series of repeating characters using the selected font sizes. In block 730 a randomly selected test screen may be presented to the user. As described above, the test screen may prompt the user to find and enter the number that is contained in the test screen.

In block 740 the user response time and accuracy may be recorded. The response time may the amount of time elapsed between presentation of the test screen and receiving user input. Accuracy may be if the user correctly identified the sequence of digits. In block 750, a score may be calculated for the test screen based on the user response. For example, a simple scoring computation may be simply taking the response time and adding a fixed value if the response was accurate. In some cases, the score may be a weighted calculation. For example, the score may be determined by multiplying the response time by some factor and then adding a fixed value, that is less than the factor, if the response was accurate. In another example, the formula used to calculate the score may be adaptive, such that the formula reflects the user's input behaviors. For example, if the initial test screens show that the user is responding very quickly but is often wrong, this may indicate that the user is rushing through the test. The result may be that accuracy is given a higher weighting. On the other hand, if the user is very accurate, but slow, it may be desirable to provide a greater weight to the response time.

In block 760 the test screen may be removed from the plurality of test screens, such that it will not be used again for the current iteration of the test. In block 770 it may be determined if there are additional test screens remaining. If so, the process moves to block 730 and a new test screen is randomly selected. If there are no additional test screens remaining, the process moves to block 780 wherein the font size is determined based on the scores, as was described with respect to FIG. 6.

The example implementation described in FIG. 7 generated all of the test screens initially, prior to displaying any test screens to the user. In a different example implementation, the system may generate the test screens as they are needed. For example, the system may randomly select a font size and generate a test screen. If it is determined that there are still trials remaining within that randomly selected font size, the screen may be presented to the user. If not, the system may again randomly select a font size and repeat. Regardless of implementation, what should be understood is that the test screens are presented to the user in a random manner, such that the user may not be able to anticipate the font size of the next screen that may be presented.

Figure 8:
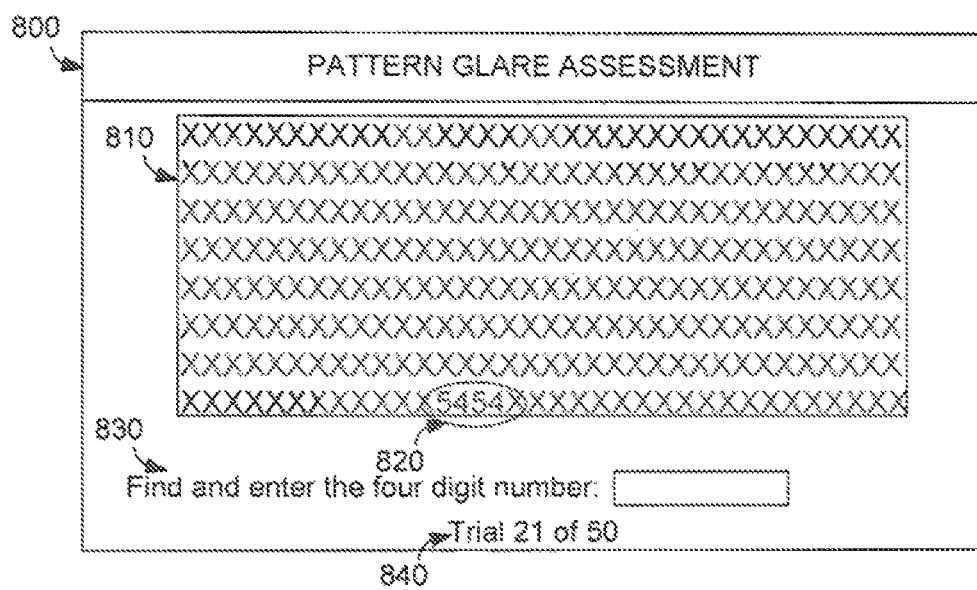
FIG. 8 depicts an example of a test screen used for selecting a density.

FIG. 8 depicts an example of a test screen used for selecting a density. Density refers to the degree of darkness of a surface. For example, in the CIELAB color space a density of zero represents black, while a density of one hundred represents white. Density may be referred to as a percentage, with zero percent representing white, while one hundred percent represents black. The test screen 800 depicted in FIG. 8 may be similar to the test screen described with respect to FIG. 5. The test screen may include a series of repeating characters 810. The test screen may also include a randomly selected series of digits 820 randomly placed within the series of repeating characters. The test screen may also prompt the user 830 to find and enter the series of digits.

Unlike the test screen described with respect to FIG. 5, in which a font size was selected from a plurality of font sizes, the test screen in FIG. 8 may use a fixed font size. In one example implementation, the font size may be selected based on the process described in FIGS. 5-7. Rather than varying the font size, the test screen described in FIG. 8 may vary the density of the text. For example, in one implementation the density may be varied in ten steps with five trials 840 within each density step.

Just as above, the test screens may be presented to a user and based on the user's input a score for each screen may be calculated. The score may again be based on a combination of the user's response time and the accuracy of the user's input. The score may weight one factor more heavily than the other. Just as above, the score may weighted adaptively based on the user's input.

Figure 9:
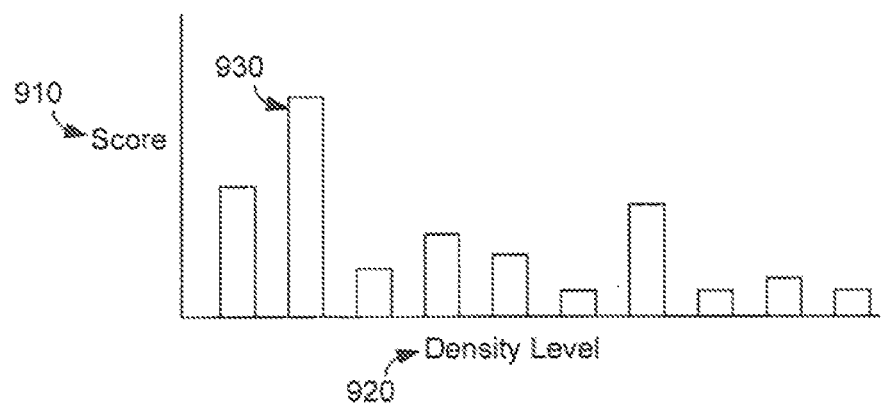
FIG. 9 depicts example results of density selection tests.

FIG. 9 depicts example results of density selection tests. For each test screen that is presented to a user, a score may be calculated based on the user's response time and accuracy of the user's response. These results may be analyzed to determine the density that may reduce pattern glare. As shown in FIG. 9, the scores may form a two dimensional chart, with one axis 910 representing the scores and the other axis 920 representing the densities. If the scores within each density are summed and plotted, a histogram may result showing the total of scores received within each density step.

As shown in FIG. 9, the results may show that one density results in higher scores than the other densities. As shown, at a certain density 930, the scores are higher than the other densities. As such, this density may be determined to be the density that has the ability to reduce pattern glare. This density may then be chosen as one of the parameters for the reduction of pattern glare, because the test results may show that other densities do not result in substantially greater test scored.

Figure 10:
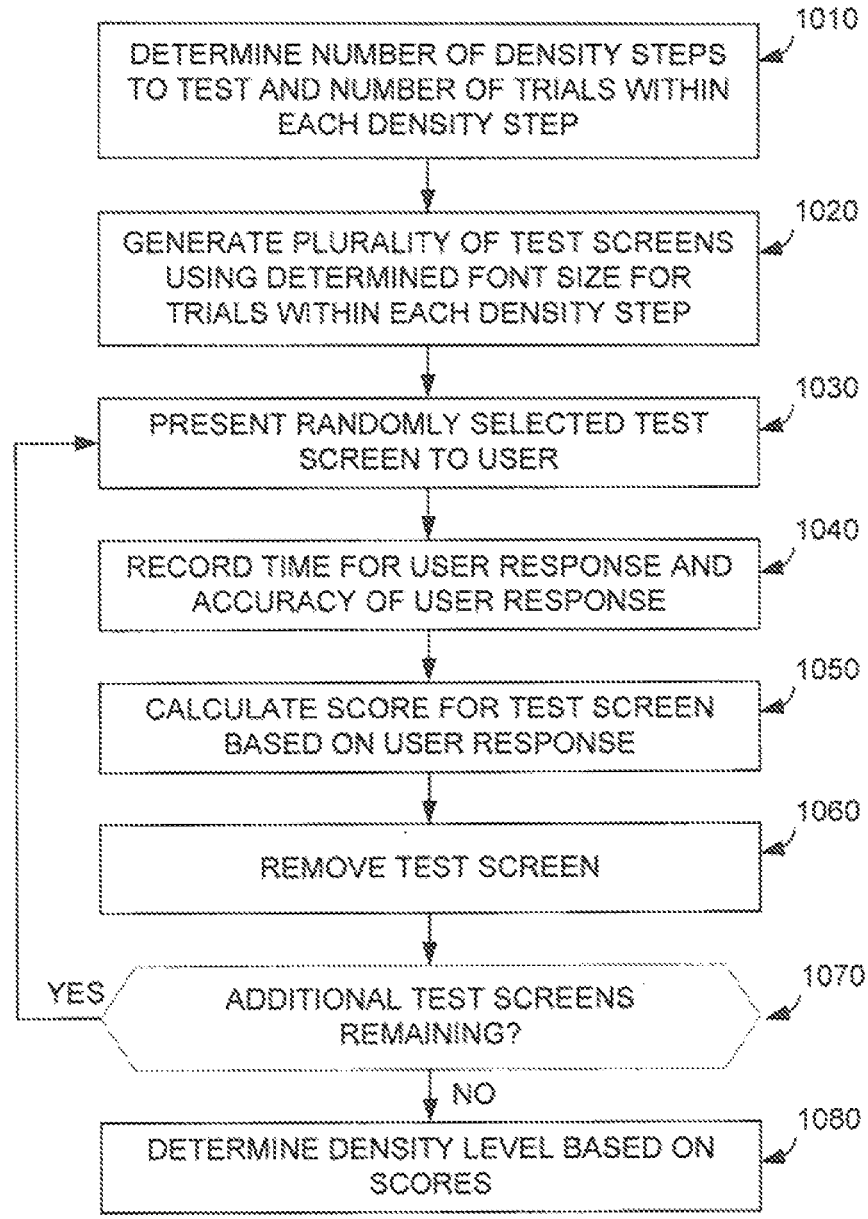
FIG. 10 depicts an example flow diagram for selecting a density.

FIG. 10 depicts an example flow diagram for selecting a density. In block 1010 the number of densities to test and the number of trials within each density may be determined. In some example implementations, the number of densities and trials may be static and is determined by design. For example, the design may specify that ten densities will be tested with five trials within each density. In other example implementations, the numbers may be dynamically determined at the time the test is run based on how much time the user is willing to spend, as was described above. For purposes of the remainder of this disclosure, it will be assumed that there are ten densities that will be tested, with five trials within each density. However it should be understood that this assumption is only for purposes of ease of description.

In block 1020 a plurality of test screens based on the determined number of densities and number of trials within each density may be created. In the present example implementation, there will be five test screens generated for each of the ten densities, resulting in a total of fifty test screens. As described with respect to FIG. 8, each test screen will contain a randomly selected sequence of digits contained within a series of repeating characters using the selected density. The font size used may be the font size that was determined with respect to FIGS. 5-7. In block 1030 a randomly selected test screen may be presented to the user. As described above, the test screen may prompt the user to find and enter the number that is contained in the test screen.

In block 1040 the user response time and accuracy may be recorded. The response time may the amount of time elapsed between presentation of the test screen and receiving user input. Accuracy may be if the user correctly identified the sequence of digits. In block 1050, a score may be calculated for the test screen based on the user response. For example, a simple scoring computation may be simply taking the response time and adding a fixed value if the response was accurate. In some cases, the score may be a weighted calculation, similar to above.

In block 1060 the test screen may be removed from the plurality of test screens, such that it will not be used again for the current iteration of the test. In block 1070 it may be determined if there are additional test screens remaining. If so, the process moves to block 1030 and a new test screen is randomly selected. If there are no additional test screens remaining, the process moves to block 1080 wherein the density is determined based on the scores, as was described with respect to FIG. 9.

The example implementation described in FIG. 10 generated all of the test screens initially, prior to displaying any test screens to the user. In a different example implementation, the system may generate the test screens as they are needed. For example, the system may randomly select a density and generate a test screen. If it is determined that there are still trials remaining within that randomly selected density, the screen may be presented to the user. If not, the system may again randomly select a density and repeat. Regardless of implementation, what should be understood is that the test screens are presented to the user in a random manner, such that the user may not be able to anticipate the density of the next screen that may be presented.

Figures 11, 12:
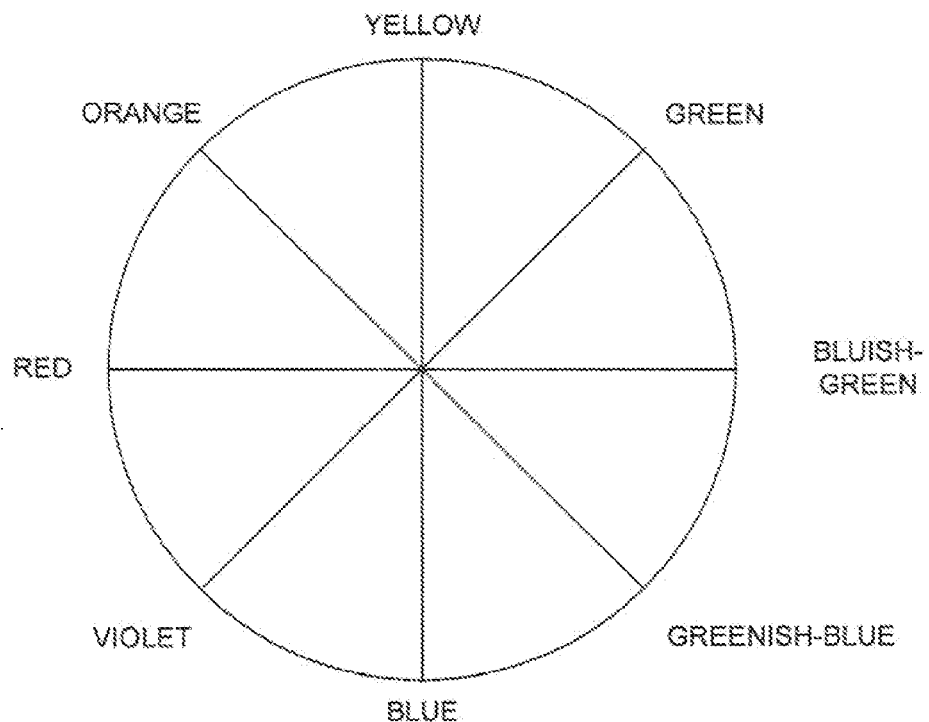
FIG. 11 depicts an example of a color wheel.
FIG. 12 depicts an example of a test screen used for selecting a color.

FIG. 11 depicts an example of a color wheel. Although the colors are not shown, a color wheel is a standard way of depicting all of the colors that may be displayed. The color when may be divided into multiple steps, with each step identifying a coarse color within the step. As shown in FIG. 11, in one example implementation, the color wheel may be divided into eight steps. Each step is shown labeled with the general color of the various colors within the step. For example, the step labeled blue may contain multiple colors that appear bluish, while the step labeled yellow contains colors that may be considered yellowish. Use of the steps will be described in further detail below.

FIG. 12 depicts an example of a test screen used for selecting a color. The test screen 1200 is very similar to the test screens described with reference to FIGS. 5 and 8. The test screen 1200 may contain a series of repeating characters 1210, with a random sequence of digits 1220 placed randomly with the series of repeating characters. The test screen may also prompt the user 1230 to enter the sequence of digits.

Unlike the previous test screens in which the font size and density were varied, the test screen may use a fixed font size and a fixed density. In an example implementation the font size and the density chosen may be determined based on the test screens that were described above. Rather than varying the font size and density, the test screen described in FIG. 12 may vary the color of the text background. For example, in one implementation, the color may be varied by randomly selecting a color from the color wheel. For example, colors may be chosen from each of the eight steps of the color wheel described above. In one example implementation, colors may first be chosen from the eight identified steps to determine the step that reduces pattern glare to the greatest degree. This selection of a step may be called a coarse color determination, as it may determine a broad section of the color wheel for use in reduction of pattern glare. The tests may then be run again, selecting colors only from the step identified by the coarse color determination to determine a fine color determination. This process will be described in further detail below.

Just as above, the test screens may be presented to a user and based on the user's input a score for each screen may be calculated. The score may again be based on a combination of the user's response time and the accuracy of the user's input. The score may weight one factor more heavily than the other. Just as above, the score may weighted adaptively based on the user's input.

Figure 13:
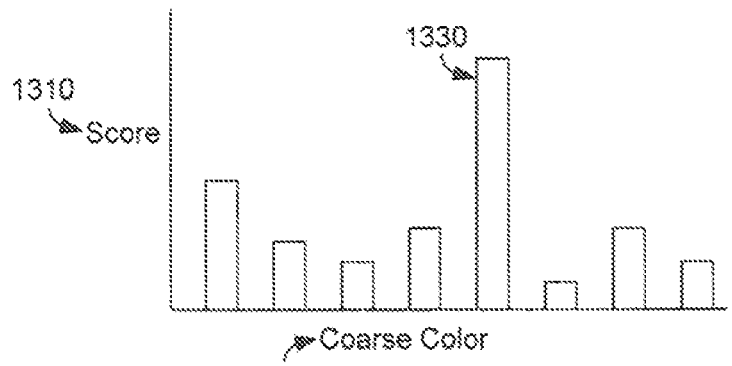
FIG. 13 depicts example results of color selection tests.

FIG. 13 depicts example results of color selection tests. For each test screen that is presented to a user, a score may be calculated based on the user's response time and accuracy of the user's response. These results may be analyzed to determine the color step that may reduce pattern glare. As shown in FIG. 13, the scores may form a two dimensional chart, with one axis 1310 representing the scores and the other axis 1320 representing the color steps. If the scores within each color step are summed and plotted, a histogram may result showing the total of scores received within each color step.

As shown in FIG. 13, the results may show that one color step results in higher scores than the other steps. As shown, in a certain, color step 1330, the scores are higher than the other steps. As such, this step may be used to determine the coarse color selection, which identifies the step of the color wheel which reduces the effects of pattern glare. The test sequence may then be run again. However in the second iteration, colors may only be chosen from the step identified by the first iteration. Thus, the first iteration determines a coarse identification of the color step, whereas the second iteration may determine a finer identification of a color. The color that produces the highest score on the second iteration may be determined to be the color used to reduce pattern glare.

Figure 14:
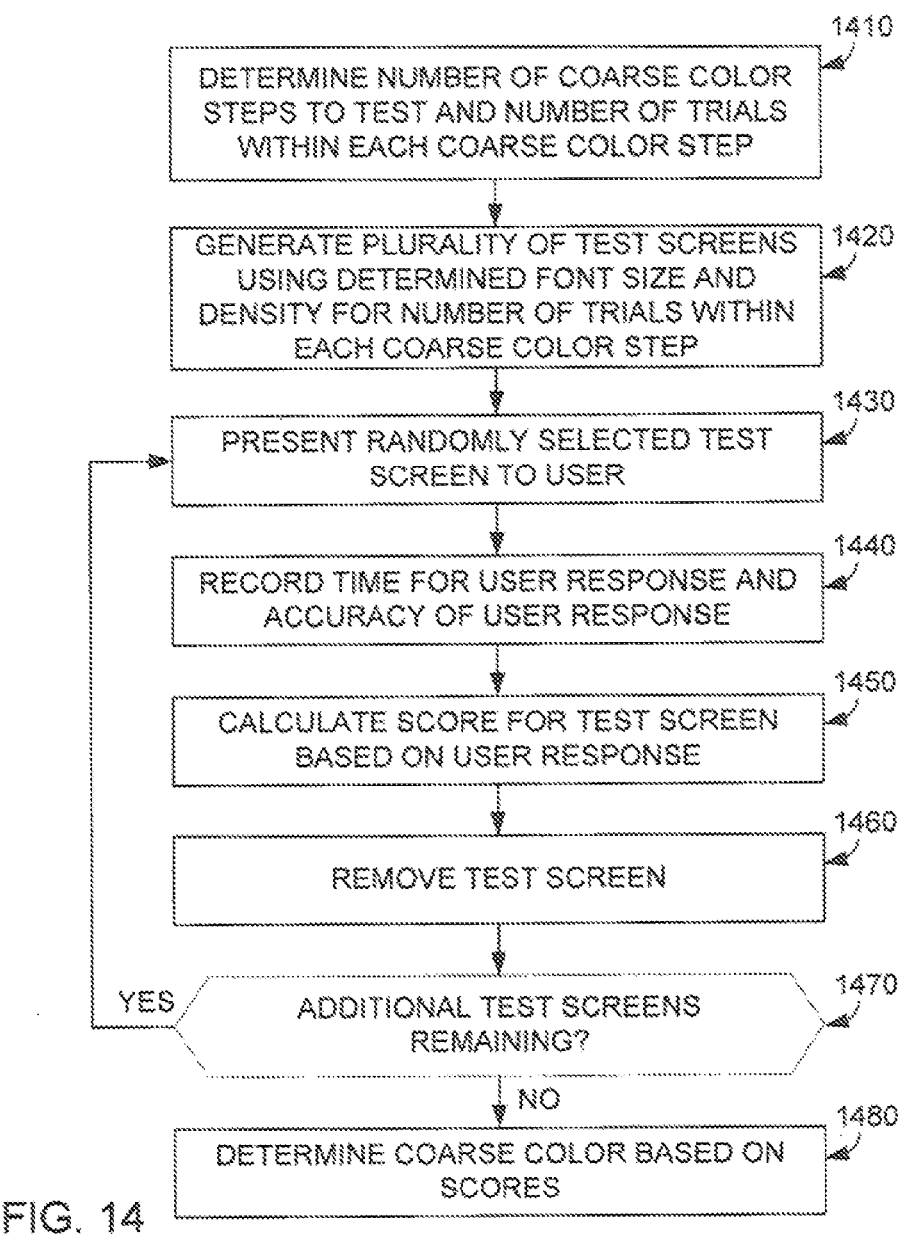
FIG. 14 depicts an example flow diagram for selecting a color.

FIG. 14 depicts a high level flow diagram for selecting a color. In block 1410 the number of color steps and the number of trials within each step may be determined. In some example implementations, the number of steps and trials may be static and is determined by design. For example, the design may specify that eight steps will be tested with five trials within each step. In other example implementations, the numbers may be dynamically determined at the time the test is run based on how much time the user is willing to spend, as was described above. For purposes of the remainder of this disclosure, it will be assumed that there are eight steps that, will be tested, with five trials within each step, for purposes of coarse color selection. However it should be understood that this assumption is only for purposes of ease of description. A different number of steps and trials may be used when selecting a fine color.

In block 1420 a plurality of test screens based on the determined number of steps and number of trials within each step may be created. For example, in the present example, there will be five test screens generated for colors within each of the eight color steps, resulting in a total of forty test screens. As described with respect to FIG. 12, each test screen will contain a randomly selected sequence of digits contained within a series of repeating characters using the selected color. The font size used may be the font size that was determined with respect to FIGS. 5-7 and the density may be the density determined with respect to FIGS. 8-10. In block 1430 a randomly selected test screen may be presented to the user. As described above, the test screen may prompt the user to find and enter the number that is contained in the test screen.

In block 1440 the user response time and accuracy may be recorded. The response time may the amount of time elapsed between presentation of the test screen and receiving user input. Accuracy may be if the user correctly identified the sequence of digits. In block 1450, a score may be calculated for the test screen based on the user response. For example, a simple scoring computation may be simply taking the response time and adding a fixed value if the response was accurate. In some cases, the score may be a weighted calculation, similar to above.

In block 1460 the test screen may be removed from the plurality of test screens, such that it will not be used again for the current iteration of the test. In block 1470 it may be determined if there are additional test screens remaining. If so, the process moves to block 1430 and a new test screen is randomly selected. If there are no additional test screens remaining, the process moves to block 1480 wherein the coarse color step is determined based on the scores, as was described with respect to FIG. 13.

The example implementation described in FIG. 14 generated all of the test screens initially, prior to displaying any test screens to the user. In a different example implementation, the system may generate the test screens as they are needed. For example, the system may randomly select a color and generate a test screen. If it is determined that there are still trials remaining within that randomly selected step, the screen may be presented to the user. If not, the system may again randomly select a color and repeat. Regardless of implementation, what should be understood is that the test screens are presented to the user in a random manner, such that the user may not be able to anticipate the color of the next screen that may be presented.

Figure 15:
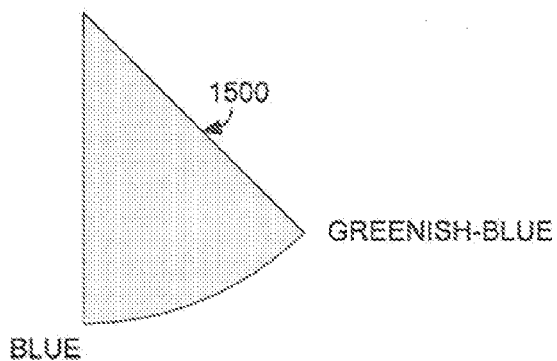
FIG. 15 depicts an example of coarse color selection.

FIG. 15 depicts an example of coarse color selection. In some implementations, the first iteration of the process described with respect to FIG. 14 is used to identify a broad step of the color wheel. This selection may be referred to as the coarse color selection, because it identifies a large area of the color wheel which results in improved scores. In some embodiments, the determination of the proper color may be further refined by repeating the color determination tests, but limiting the area of the color wheel to the step determined by the coarse color selection.

As shown in FIG. 15, step 1500 may be a step that was determined to produce a reduction in pattern glare. As shown, step 1500 is a subset of the entire set of available colors. The process described with respect to FIGS. 12-14 may then be repeated. However, this time colors may be selected from within the step 1500. The second iteration of the color determination may use a different number of trials and a different number of sub-steps. For example, in one implementation, the identified coarse step may be divided into six sub-steps. Test screens may then be generated by randomly selecting colors from within each of the six sub-steps.

Figure 16:
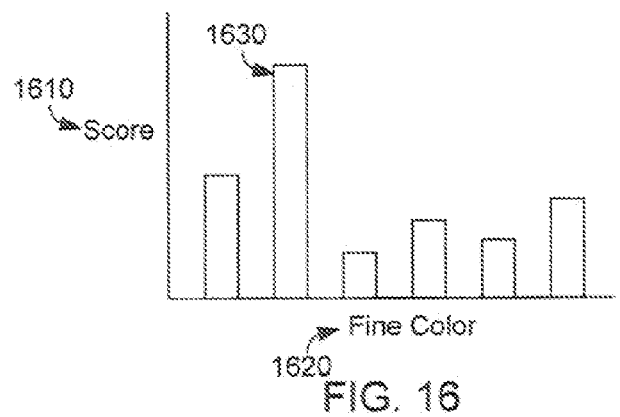
FIG. 16 depicts an example of fine color test results.

FIG. 16 depicts an example of fine color test results. FIG. 16 depicts results that are very similar to FIG. 9. For example, the results include the scores on one axis 1610 and the fine color on the other axis 1620. The scores may be plotted, and the resulting highest score 1630 may be used to determine the fine color selection. The fine color may then be used as one of the parameters for reduction of pattern glare.

In some example implementations, the process described with respect to FIGS. 5-7 may then be repeated. However, in the second iteration of font size selection, the density and color that were determined may be used. As such, the font size may then be reselected based on test screens using the density and color that have shown an ability to reduce pattern glare.

Figure 17:
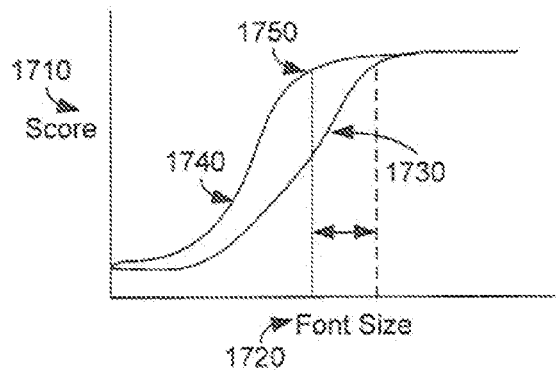
FIG. 17 depicts an example of comparative results.

FIG. 17 depicts an example of comparative results. In some example implementations, the process described with respect to FIGS. 5-7 may then be repeated. However, in the second iteration of font size selection, the density and color that were determined may be used. As such, the font size may then be reselected based on test screens using the density and color that have shown an ability to reduce pattern glare.

FIG. 17 shows the results of the font size test. The scores are plotted on one axis 1710 while the font size is plotted on a second axis 1720. A trend line may be plotted and the original results 1730 may be compared with the results obtained using the density and color that were determined to reduce pattern glare 1740. As shown in FIG. 17, the results may show that the curve now begins to flatten at a different point 1750. If the curve begins flattening at a smaller font size, it may be due to selection of the density and color that reduces pattern glare. As such, FIG. 17 depicts an example of test results which shows any improvements based on the selection of display parameters to reduce pattern glare. These parameters may then be used to create a profile, as was described above, such that the parameters may be used in environments other than the environment in which the testing occurred.

Figure 18:
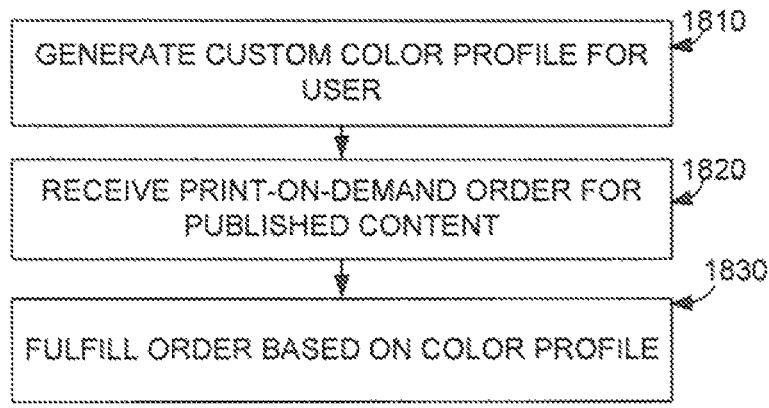
FIG. 18 depicts an example flow diagram for fulfilling a print order.

FIG. 18 depicts an example flow diagram for fulfilling a print order and includes particular operations and execution order according to certain embodiments. However, in different embodiments, other operations, omitting one or more of the depicted operations, and/or proceeding in other orders of execution may also be used according to teachings described herein.

A system generates 1810 a custom color profile (e.g., an ICC profile) for a user in response to user input (e.g., as described herein). The system may be distributed over a network or it may be consolidated into a single device. The system receives 1820 a print-on-demand (POD) order for published content. The POD order may be received via a conventional ecommerce protocol (e.g., EDI, cXML, etc.), a graphic arts workflow protocol (e.g., PrintTalk®, etc.) or other suitable protocol. The system fulfills 1830 the POD order in view of the custom color profile. For example, the custom color profile may dictate a particular font size or background color for the POD order. Thus, the POD order is printed based on these profile details for the user.

Figure 19:
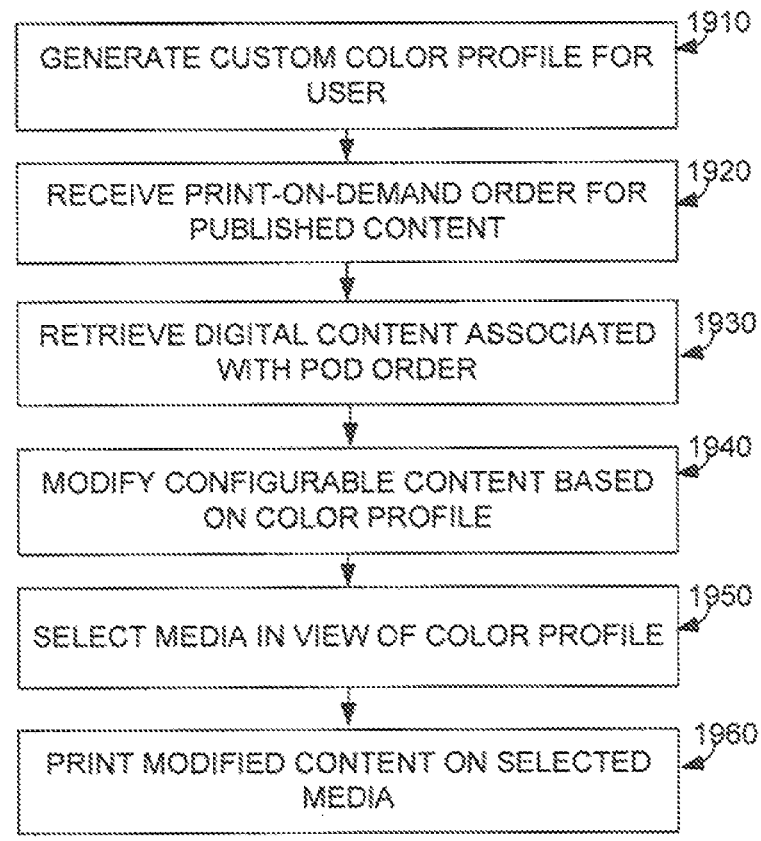
FIG. 19 depicts an example flow diagram for fulfilling a print order.

FIG. 19 depicts an example flow diagram for fulfilling a print order and includes particular operations and execution order according to certain embodiments. However, in different embodiments, other operations, omitting one or more of the depicted operations, and/or proceeding in other orders of execution may also be used according to teachings described herein.

A system generates 1910 a custom color profile (e.g., an ICC profile) for a user in response to user input (e.g., as described herein). The system may be distributed over a network or it may be consolidated into a single device. The system receives 1920 a print-on-demand (POD) order for published content. For example, the published content could be a textbook or other book, pamphlet, paper, etc. The POD order may be received via a conventional ecommerce protocol (e.g., EDI, cXML, etc.) or it could be received via a graphic arts workflow protocol (e.g., PrintTalk®, etc.).

In response to receiving the POD order, the system retrieves 1930 the content associated with the order. In various embodiments, the content is retrieved from a database, perhaps using a network connection. The database could be part of the system or it could be a third-party database belonging to, for example, the publisher of the content. The custom color profile associated with the POD order may be formatted according to the Job Definition Format (JDF) specification or other suitable protocol. Based on the color profile, the system modifies 1940 configurable printing and finishing details. For example, font size may be one of the customizable printing options offered by the system. If the custom profile for the user calls for a particular font size, then the system modifies the font size of the digital content in preparing (e.g., formatting, rasterizing, etc.) the print job. The custom profile for the user may also call for a particular media type or background color. Accordingly, the system selects 1950 the appropriate media in view of the custom user profile. With the job formatted and media selected in view of the color profile, the system prints 1960 the POD order on the selected media.

Figure 20:
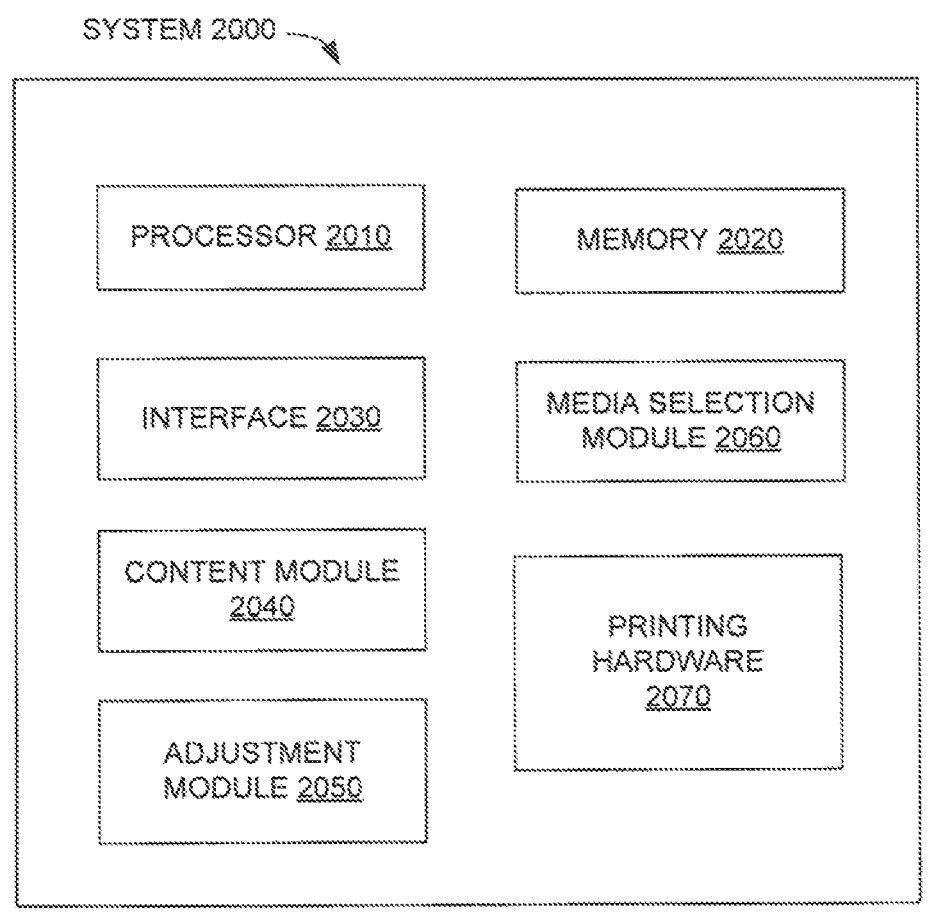
FIG. 20 depicts an example system that may implement techniques described herein.

FIG. 20 is a block diagram illustrating a system according to various embodiments. FIG. 20 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these. Various modules and/or components illustrated in FIG. 20 may be implemented as a computer-readable storage medium containing instructions executed by a processor (e.g., processor 2010) and stored in a memory (e.g., memory 2020) for performing the operations and functions discussed herein.

System 2000 includes an interface 2030 to receive print-on-demand (POD) orders for published content (e.g., textbooks, books, journals, papers, etc.). In various embodiments, POD orders include customized printing instructions to reduce pattern glare. As discussed herein, pattern glare may be reduced by adjusting a display or printing content in view of a customized color profile (e.g., ICC profile) generated for a particular user to reduce pattern glare, as described herein.

A content module 2040 retrieves digital content associated with the POD order. Digital content may be retrieved from a local database or from a content provider database, for example, via a network connection. In various embodiments, the digital content contains metadata that defines various customizable options. Given the customizable options associated with the digital content, an adjustment module 2050 adjusts the digital content in view of the customized printing instructions received with the POD order. For example, the customized printing instructions might call for a text font size that is different than the default text font size associated with the digital content. Other customizable options might include, but are not limited to, font style (e.g., serif vs. sans-serif fonts, etc.), line spacing, text density, text color, background color (e.g., including highlighting text), media type, and media size. In embodiments where the digital content is associated with a textbook, the page layout may be fixed, meaning that adjusting the content to a larger font size may result in an increase in the page size of the printed material. In this way, students having customized textbooks with different font sizes can still have the same page numbering, allowing teachers and students to be on the same page when discussing material in the textbook.

Media selection module 2060 selects media, upon which to print the (possibly modified) digital content in view of the customized printing instructions. For example, if the user color profile calls for a particular background color (e.g., pink vs. white, etc.) or finish (e.g., glossy vs. non-glossy, etc.), media selection module can select the most appropriate media to fulfill the order. In some embodiments, media selection module 2060 selects media on an "exact fit" basis based on the printing instructions though media could also be selected on a "best fit" basis based, for example, on a priority scheme for the printing instructions.

Various modifications may be made to the disclosed embodiments and implementations of the invention without departing from their scope. Therefore, the illustrations and examples herein should be construed in an illustrative, and not a restrictive sense.

We claim:

1. A non-transitory computer-readable storage medium storing instructions that, when executed, cause a system to:
   receive a print-on-demand (POD) order for published content for a particular user, the POD order including customized printing instructions to reduce pattern glare, the customized printing instructions being determined based on a response time and accuracy of the user in providing inputs on one or more test interfaces;
   retrieve digital content associated with the POD order;
   process the digital content in view of the customized printing instructions;
   automatically select media upon which the digital content is to be printed in view of the customized printing instructions; and
   cause the processed digital content to be printed on the selected media.

2. The non-transitory computer-readable storage medium of claim 1, wherein the customized printing instructions specify at least one of:
   text font size;
   text font style;
   line spacing;
   text density;
   background color; or
   media type.

3. The non-transitory computer-readable storage medium of claim 1, wherein the customized printing instructions vary by sub-portion of the published content.

4. The non-transitory computer-readable storage medium of claim 1, wherein the instructions cause the system to:
   automatically selecting a media size to maintain a fixed page layout for the published content.

5. A system, comprising:
   memory resources;
   a processor coupled to the memory resources to implement:
      an interface to receive a print-on-demand (POD) order for published content for a particular user, the POD order including customized printing instructions to reduce pattern glare, the customized printing instructions being associated with a profile of the user that has been previously generated based on inputs provided by the user on one or more test interfaces, wherein the customized printing instructions are determined based on a response time and accuracy of the user in providing the inputs on the one or more test interfaces;
      a content module to retrieve digital content associated with the POD order;
      an adjustment module to adjust the digital content in view of the customized printing instructions;
      a media selection module to select media upon which the digital content is to be printed in view of the customized printing instructions; and
   printer hardware to print the adjusted digital content on the selected media.

6. The system of claim 5, wherein the selection module further:
   automatically selects a media size to maintain a fixed page layout for the published content.

7. The system of claim 5, wherein the customized printing instructions specify at least one of:
   text font size;
   text font style;
   line spacing;
   text density;
   background color; or
   media type.

8. The system of claim 5, wherein the customized printing instructions vary by sub-portion of the published content.

9. The system of claim 5, wherein the published content is retrieved from a content provider over a network.

10. The system of claim 5, wherein the one or more test interfaces includes a plurality of repeating characters with a set of digits.

11. The system of claim 10, wherein the one or more test interfaces prompts the user to find the set of digits within the plurality of repeating characters and input the set of digits.

12. The system of claim 5, wherein the profile of the user is further based on ambient light detected at a time the inputs were provided by the user on one or more test interfaces.

13. A method for fulfilling a print order, the method being performed by a processor and comprising:

receiving a print-on-demand (POD) order for published content for a particular user, the POD order including customized printing instructions to reduce pattern glare, the customized printing instructions being determined based on a response time and accuracy of the user in providing inputs on one or more test interfaces;

retrieving digital content associated with the POD order;

processing the digital content in view of the customized printing instructions;

automatically selecting media upon which the digital content is to be printed in view of the customized printing instructions; and causing the processed digital content to be printed on the selected media.

14. The method of claim 13, further comprising:

automatically selecting a media size to maintain a fixed page layout for the published content.

15. The method of claim 13, wherein the customized printing instructions specify at least one of:

text font size;
text font style;
line spacing;
text density;
background color; or
media type.

16. The method of claim 13, wherein the customized printing instructions vary by sub-portion of the published content.

17. The method of claim 13, wherein the published content is retrieved from a content provider over a network.

18. The method of claim 13, wherein the one or more test interfaces includes a plurality of repeating characters with a set of digits.

19. The method of claim 18, wherein the one or more test interfaces prompts the user to find the set of digits within the plurality of repeating characters and input the set of digits.

20. The method of claim 13, wherein the customized printing instructions are associated with a profile of the user that has been previously generated based on the inputs provided by the user on the one or more test interfaces, wherein the profile is further based on ambient light detected at a time the inputs were provided by the user on one or more test interfaces.

* * * * *